Feb. 20, 1934.    S. WHITWORTH    1,947,894
BRAKE SHOE
Filed Jan. 4, 1929
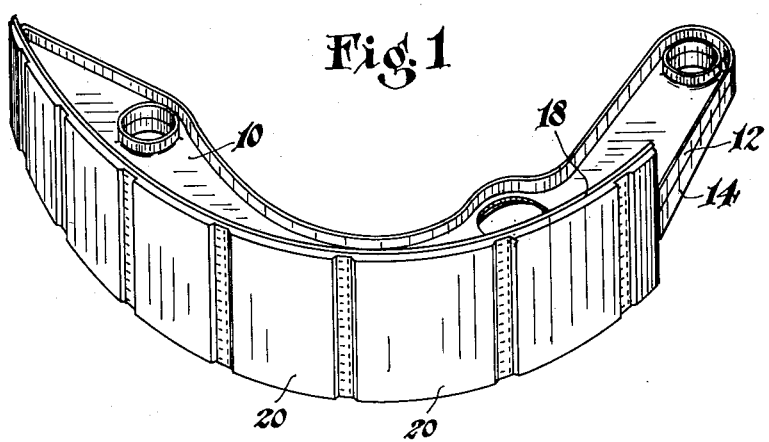
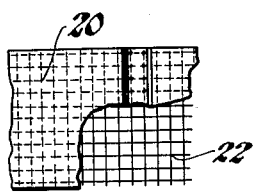
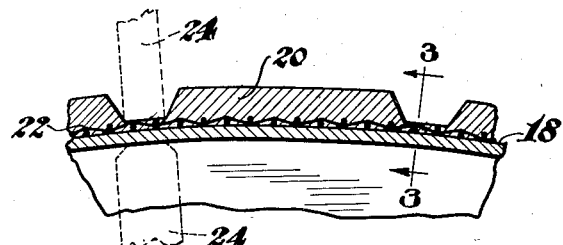
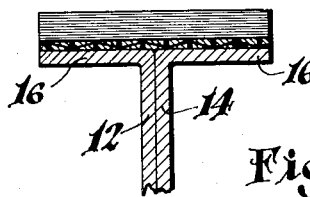
INVENTOR.
Stanley Whitworth
BY
ATTORNEY Patented Feb. 20, 1934

1,947,894

UNITED STATES PATENT OFFICE 1,947,894

BRAKE SHOE

Stanley Whitworth, South Bend, Ind., assignor to Bendix Brake Company, South Bend, Ind., a corporation of Illinois Application January 4, 1929. Serial No. 330,346

4 Claims. (Cl. 188—234)

This invention relates to brakes and is illustrated as carried out in the manufacture of a shoe for an internal expanding automobile brake. An object of the invention is to provide an inexpensive method of securing a friction facing to a rigid metallic brake shoe or the like, preferably by welding to the shoe a lining having a metallic backing. Preferably the friction facing is in the form of a series of segments of friction material mounted on a metallic backing, the successive segments preferably being spaced a short distance apart to expose the backing on the outer surface of the facing. The facing is mounted on the brake shoe and welded to the shoe at the points where the backing is exposed.

The above and other objects and advantages of the invention will be apparent from the following description of one illustrative type of shoe shown in the accompanying drawing in which:

Figure 1 is a perspective view of a completed shoe faced with brake lining welded thereto;

Figure 2 is a longitudinal section partly broken away illustrating the welding of the lining to the shoe;

Figure 3 is a section substantially on line 3—3 Figure 2; and

Figure 4 is a fragmentary plan view of the brake lining showing the spaced segments and the exposed portion of the metallic base to be welded to the shoe face.

In that embodiment of my invention disclosed in the drawing there is provided a rigid metallic brake shoe 10 preferably consisting of back to back web sections 12 and 14 supporting on their flanged edges 16 an arcuate rim section 18.

The friction member comprises a series of spaced fabric segments impregnated with a suitable binder and having as a base a continuous woven wire embedded in the segments and rigidly uniting the segments therewith. The wire base is exposed at the separable ends of the segments and provides an open portion whereby the base is welded to the shoe by means hereinafter described.

According to an important feature of the invention, I propose to permanently secure the aforementioned lining material to the rim face 18 which may be readily effected by welding the exposed wire directly to the contiguous rim face as disclosed in Figure 2. I prefer to employ in the welding operation electrodes 24, one of which is preferably of a shape to completely fill the space between the segments 20.

A strong and effective brake element is thus produced, the spaced welds, extending across the width of the shoe, insuring a rigid connection between the friction material and the body of the shoe to obviate relative movement of the parts.

While but one embodiment of my invention has been disclosed and described in detail, it is not my intention to be thus limited but only as far as may be defined by the scope of the appended claims.

I claim:

1. In a brake shoe, the combination with a metallic rim of a friction member comprising a series of spaced fabric friction segments with a continuous woven wire base embedded in the underside thereof and welded to the rim at the separable ends of the segments.

2. In a brake shoe, the combination with a metallic rim of a friction member comprising a series of spaced fabric friction segments with a continuous woven wire base embedded in the underside thereof and welded to the rim at the exposed portions intermediate the segments.

3. A brake shoe comprising a metallic rim and a friction member having a series of transversally disposed spaced segments mounted on a continuous base of woven wire and welded to the rim at the exposed portions intermediate the segments.

4. A brake shoe comprising a series of spaced fabric segments having embedded in the underside thereof a continuous wire base having exposed portions between the spaced segments and welded thereat to the metallic rim of the brake shoe.

STANLEY WHITWORTH.